Nov. 10, 1931.  A. G. COLE ET AL  1,831,288
TIRE MOLD AND ITS MANUFACTURE
Filed Nov. 24, 1920  2 Sheets-Sheet 1
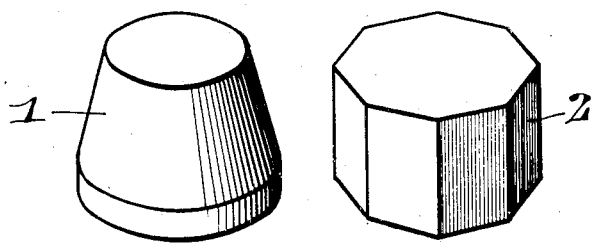
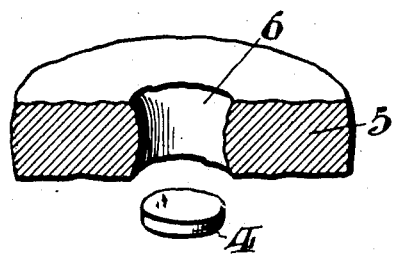
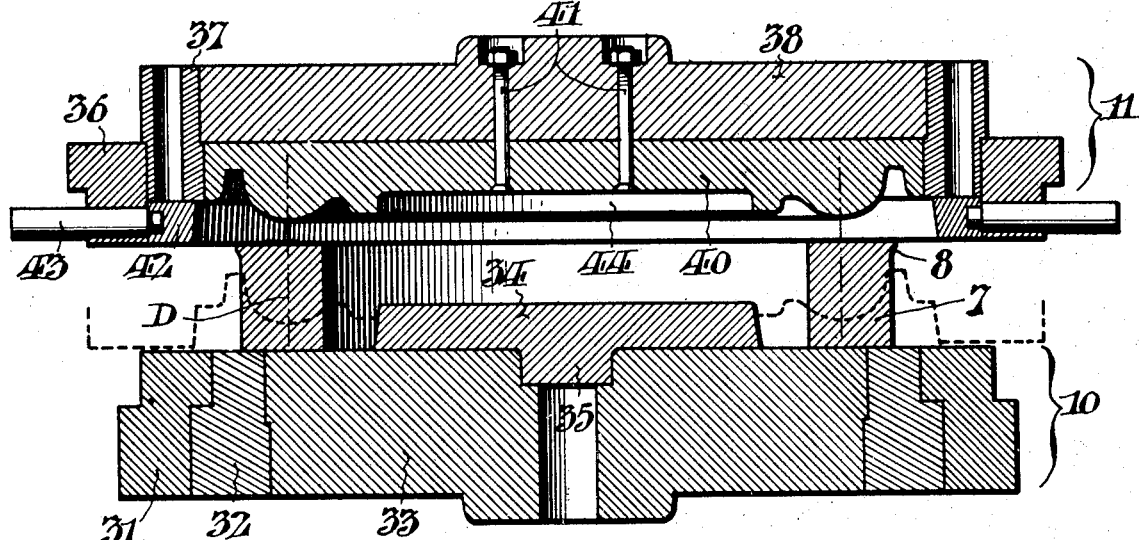
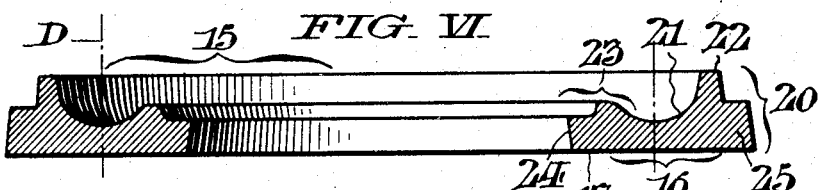
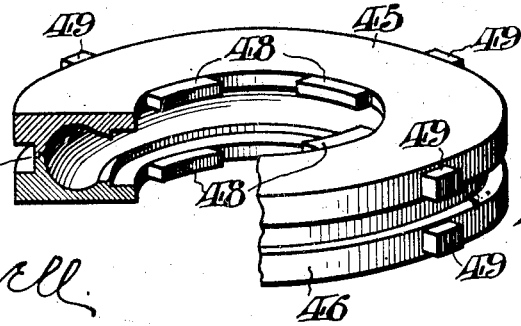
WITNESSES:
INVENTORS:
Amos G. Cole &
Harry B. Cochran,
ATTORNEYS.

Nov. 10, 1931.  A. G. COLE ET AL  1,831,288
TIRE MOLD AND ITS MANUFACTURE
Filed Nov. 24, 1920  2 Sheets-Sheet 2
FIG. VIII
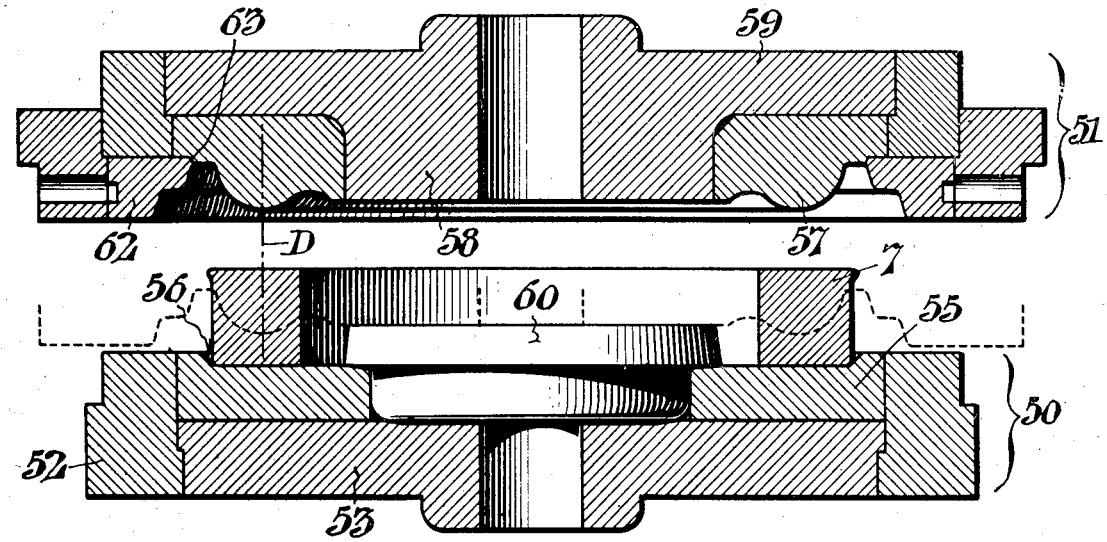
FIG. IX
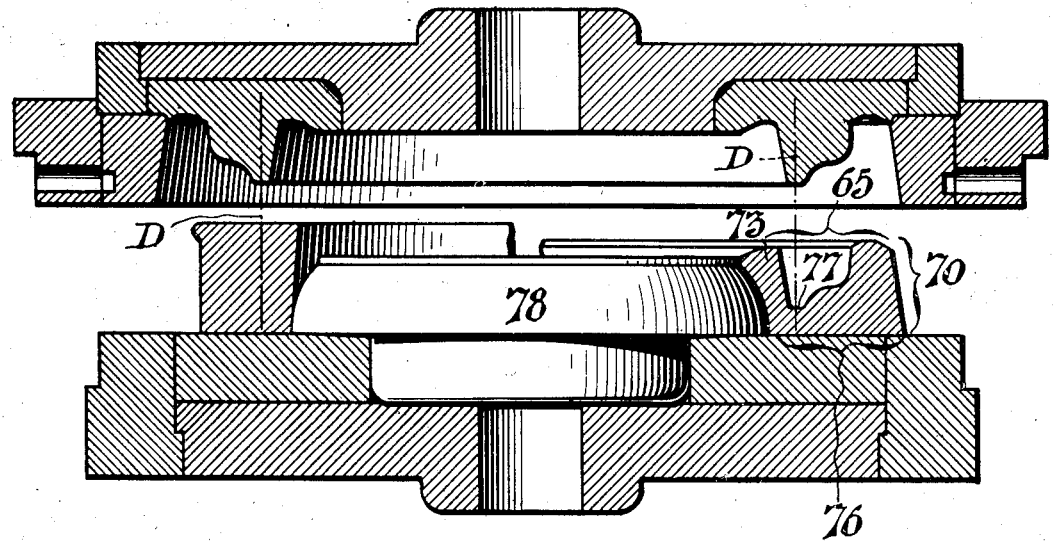
WITNESSES:
John E. Bergner
James H. Bell
INVENTORS:
Amos G. Cole &
BY Harry B. Cochran,
ATTORNEYS.

Patented Nov. 10, 1931

1,831,288

UNITED STATES PATENT OFFICE

AMOS G. COLE, OF LEWISTOWN, AND HARRY B. COCHRAN, OF REEDSVILLE, PENNSYLVANIA, ASSIGNORS TO STANDARD STEEL WORKS COMPANY, OF PHILADELPHIA, PENNSYLVANIA, A CORPORATION OF PENNSYLVANIA

TIRE MOLD AND ITS MANUFACTURE

Application filed November 24, 1920. Serial No. 426,143.

Our invention relates to tire molds and their manufacture, and it is especially concerned with forged steel pieces for molds used in making rubber tires, such as automobile tires or "shoes".

In making automobile tires, the rubber is vulcanized and thereby "set" in its desired normal form by heating under pressure in a mold. After this operation, the mold must be opened very promptly, in order that the rubber tire may be removed therefrom without undue difficulty; and to permit this, the mold is suddenly cooled or "quenched" with water. The type of mold most generally employed in rubber tire factories has hitherto been made of cast iron, for the reason that no other commercially available material capable of standing the stresses incident to the pressure in vulcanizing could be brought to the form required for certain principal parts of the mold—more especially its side pieces—by any known practical method.

Cast iron molds, however, are subject to a very serious drawback in that they will not stand many repetitions of the sudden quenching at substantially a vulcanizing temperature which (as stated above) is necessary at each vulcanizing operation; indeed, such molds seldom outlast the production of some six to nine tires or less therein, and it is by no means rare for a mold to be ruined the first time it is used. This speedy failure of the cast iron mold is largely due to the so-called "growth" of the cast iron, which expands when heated, but does not contract properly when suddenly chilled: the result is not only enlargement, warping, or other distortion of the mold, but cracking and disruption due to the strains set up in the metal at quenching.

We have discovered that molds free from this drawback of cast iron ones can be made out of a material that is equally strong or stronger, but is not ruined by oft-repeated heating and sudden chilling or quenching: viz., forged steel. As a result of our invention, forged steel tire mold side pieces can be simply and expeditiously formed by die-pressing, and the entire mold manufactured of this material at a very moderate cost. Technical difficulties in die-pressing steel to laterally hollowed annular mold contours can be overcome, we have discovered, by certain dimensional correlations between the piece to be formed and the initial metal piece or blank on which the dies act,—a correlation involving height and radial dimension of metal in the blank and the piece. Such correlation enables the piece to be formed as desired by die-pressing in one direction only. The useful life of forged steel tire molds so greatly exceeds that of cast iron molds that any difference in first cost in favor of the latter is much more than overbalanced: e. g., molds produced through our invention are still in use and perfectly good after undergoing twenty or more vulcanizing operations and quenchings.

For the benefit of those desiring to practice our invention, we have hereinafter described in detail the best forms and modes of carrying it out at present known to us, indicating in our claims the scope and essentials of the invention in its various phases and aspects. It will be observed that in some aspects the invention is not confined to the manufacture of tire molds, but can be adapted and applied to the production of other articles.

In the drawings, Figs. I and II are tilted views of forms of steel slug suitable as the starting point in the manufacture of a forged steel tire mold piece in accordance with our invention.

Fig. III is a tilted view, partly in axial section, illustrating certain intermediate steps in the production of an annular forged steel blank from one of the slugs shown in Figs. I and II.

Fig. IV is a similar view of the annular blank eventually produced, said blank being suitable for die-pressing in accordance with our invention.

Fig. V is a sectional elevation of a set of dies and accessory parts, together with a blank such as shown in Fig. IV. The "closed" position of the upper die-faces is here indicated in dotted profile.

Fig. VI is a sectional elevation of the forged steel piece produced by the operation illustrated by Fig. V.

Fig. VII is a tilted view, partly broken away and in section, showing a couple of pieces such as illustrated in Fig. VI machine-finished and assembled to form the outer portion of a tire-mold.

Fig. VIII is a view similar to Fig. V illustrating a somewhat modified set of pressing dies and their operation.

Fig. IX is a view similar to Figs. V and VIII illustrating the production of a mold form differing considerably from those indicated in those figures.

In making a forged steel tire mold side piece, we prefer to start with a steel slug of one of the shapes and of about the proportions illustrated in Figs. I and II,—these shapes being the ones described in a paper by Lawford H. Fry published in the 1919 year book of the American Iron and Steel Institute, pages 435 to 459. Such a slug 1 or 2 may either be an individually cast ingot produced according to the practice described in said paper, or a section of a larger ingot produced in any suitable and convenient way. A satisfactory steel for this slug is a basic or acid open hearth manganese steel containing about .25 to .35% carbon and otherwise of about the composition mentioned at the begining of the aforesaid paper as used in wheels and tires. The style, size, and weight of the slug will, of course, be determined by the particular size and weight of forged steel tire mold side piece to be produced, with due allowance for "shrinkage" or loss of metal in the processes of manufacture.

After being brought to proper forging temperature in a heating furnace, the slug 1 or 2 is placed under a powerful steam hammer (e. g., a 16,000 lb., one) and hammered down into a circular disc about 6" thick. Then a fair-sized hole is punched through the center of this disc (as by means of a frusto-conical punch driven first from one side and then from the other); this removes a small, thin, flat metal disc 4 (see Fig. III) weighing only about eight to ten pounds. (Supposing that the slug 1 or 2 used was an individual ingot produced according to the practice set forth in the above cited paper, the punching out of the disc 4 will eliminate the entire portion of the metal vitiated by piping or segregation in the casting of this ingot.) This gives a flat, circular round-edged, cheese-like disc 5 (Fig. III) pierced with a hole 6 tapering each way toward the middle. If desired, this pierced disc 5 may (without reheating) be placed edge up on the horn of an anvil beneath a powerful steam hammer and hammered edgewise to enlarge it somewhat, being then further hammered on the flat to restore it to a suitable definite uniform thickness and flatness.

After being reheated to a proper rolling temperature in a heating furnace, the pierced disc or annulus (whether enlarged etc., by hammering as just described or not) is preferably subjected to a rolling operation (similar to that employed in making steel tires) by which it is enlarged and shaped into an accurately circular ring 7 (see Fig. IV), of proper size and of suitable uniform cross section to serve as a blank for the die-pressing operation to be presently described. (As shown, this annular blank 7 has at one of its outer corners a slight beading 8 that resembles a rudimentary wheel flange; this, however, is a mere incidental consequence of rolling-mill technique, and neither essential nor prejudicial to the proper behavior of the blank in die-pressing.) The exact proportions, cross sections, and annular size of the rolled blank 7 will depend, of course, on the particular size and configuration of the final die-pressed forging desired.

The foregoing is the method which we prefer to employ in preparing a blank for die-pressing into a tire-mold piece, since this method is simple, convenient, expeditious, reliable, relatively inexpensive, and involves but very small shrinkage or loss of metal; moreover, the thorough mechanical working of the metal involved in bringing it to shape improves its grain and fitness for the die-pressing operation that is to follow, and also improves the texture and strength of the final product. The particular mode of mechanical working described, also, affects all parts of the metal to about the same extent. It is to be understood, nevertheless, that although this mode of preparing the blank is a valuable subordinate, adjunctive feature of our invention, yet it is by no means essential; on the contrary, satisfactory final results may be obtained with a blank prepared by any method or process that will produce a sound body of mechanically workable metal having a proper composition, weight and shape. However, it is preferable that the mode of preparation of the blank be one involving mechanical working of the metal, in order that an improvement of the metal equivalent to that mentioned above may be brought about.

Up to and including the production of the annular blank 7 as above described, the shrinkage or loss of metal due to the punching operation indicated in Fig. III and to scaling, etc., will in good practice amount to about 4½ to 5% of the weight of the initial slug 1 or 2 of Fig. I or II,—particularly the octagonal slug 2. The slight further shrinkage of metal from scaling incident to the die-pressing operation next ensuing will depend on the details and incidents of that operation; and proper allowance therefor in the weight of the initial slug 1 or 2 will naturally be made by those skilled in the art, without any special instructions from us.

The forged and rolled annular blank 7 is now charged once more into a heating furnace, and reheated to proper temperature for die-pressing,—say a light yellow, or about 2000° F. This die-pressing operation may be done under a powerful hydraulic forging press,—say of 5000 to 10,000 tons capacity. The hot annular blank 7 is placed between die-faces of shapes appropriate for the sides of the piece to be formed, and the dies are then progressively forced together upon the blank by the press, so as to bring the hot metal into the desired configuration or mold contour. The pressure to which the metal is subjected in the "final squeeze" of the dies may be about 6500 lbs. per sq. in. As shown in Figs. V, VIII, and IX, the dies act on the metal in the axial direction in this operation.

The dies 10 and 11 of Fig. V are adapted to produce the annular forged steel tire mold side piece 15 shown in axial mid-section in Fig. VI. This piece 15 comprises a web portion 16 that is substantially flat on one side 17 (intended to form the outside of the tire-mold), and a deep flange or rim portion 20 outstanding laterally with reference to said web portion 16, at or near its outer edge and away from its flat side 17. The other side of the web portion 17 (intended to form the inside of the tire-mold) is hollowed out in general correspondence with the side of a rubber tire, and merges in a curve at 21 with the inner side of the flange portion 20, which corresponds to the tread of the tire. At or near its inner edge, the web portion 16 has a flange or shoulder portion 23, which in the present instance is not very deep, and corresponds in a general way with the outer surface of the base of the tire. The extreme inner and outer portions 24 and 25 of the piece project somewhat beyond the rest of the flange portions 23 and 20, and thus in a manner belong both to the web portion 16 and to said flange portions.

Returning, now, to Fig. V, it will be seen that the lower die 10 (which rests on the stationary bed of the press) has an acting face that affords a substantially plane, flat upper surface adapted to form the flat lower side 17 of the piece 15 in Fig. VI, while the acting face of the upper die 11 (which moves with the press head) corresponds in shape to the upper side of said piece and its outer edge. The lower die is built up of a couple of shouldered bands 31 and 32 shrunk or otherwise fitted on one another and on a peripherally shouldered and centrally apertured bottom plate 33; these parts may rest and be secured on the permanent bed of the press in any preferred manner. On the bottom plate 33 rests a flat, round, disc-like "center punch" 34, held in position by engagement of a short round projection 35 at its lower side in an enlargement of the upper end of the bore of said plate. The upper die 11 comprises an externally shouldered band 36 shrunk or otherwise fitted on an externally and internally shouldered band 37 which is itself shrunk or otherwise fitted on a circular top plate 38: these parts, likewise, may be secured to the movable press head in any preferred manner. The acting face of the die 11 is for the most part on a circular member 40 seated within the band 37 and secured to the top plate 38 by a couple of bolts 41; but it also comprises both an externally grooved annular forging band member 42 (fitting within the band 36, and secured by engagement in its groove of the inner ends of pins 43 that fit closely in holes in the band 36) and a narrow zone on the lower face of the band 37 which is exposed between the forging band 42 and the outer edge of the part 40. When the upper die 11 is in its lowermost, substantially closed position indicated in dotted lines, the cylindrical upper portion of the punch 34 is accommodated in a large, shallow, central circular recess 44 in the part 40.

In practice, it will generally be found necessary to machine the tire mold side piece 15 shown in Fig. VI to secure the exact shape and smoothness of surface desired; and practical considerations in the technique of die-pressing may require such a design of the die-faces as will necessitate removal of a considerable amount of metal (up to ½ inch or more in thickness) at many places. Fig. VII shows two complementarily machine-finished die-pressed tire-mold side pieces 45 and 46 assembled to form the outer portion of a tire-mold,—the other parts and accessories of the mold being omitted to avoid confusion of the drawing. (These other associated and accessory parts may also be made of die-pressed forged steel, if desired.) As shown, the tops of the flange portions 22 of the pieces 15 employed may be so machined as to afford interfitting shoulders and rabbeted seats at 47; also, the mold halves may be provided with the usual inner and outer lugs 48 and 49 by welding suitable pieces of forged steel to the pieces 15, or by appropriately machining suitably extended inner and outer portions 24 and 25 of said pieces.

In Fig. VIII, we have shown a set of dies 50 and 51 adapted to make a piece very similar to the piece 15 of Figs. V and VI.

As to the lower die 50, it will be observed that only a single shouldered band 52 is employed, and that the bottom plate 53 rests directly on it and is of so much less thickness as to afford a socket thereabove for an annular lower die member 55. The acting face of this member 55 is for the most part slightly depressed a short distance below the top surface of the band 52,—the inclined outer edge 56 of this circular depression coinciding approximately with the greatest depth of the flange portion of the piece to be produced. This feature of the lower die 50 gives rise to a slight difference in the conformation of the lower side of the formed piece; but said lower side still remains substantially flat (save at the outer portion of the piece), as in Figs. V and VI. The depression in the member 55 and the outside diameter of the annular blank 7 employed are preferably so proportioned that the lower outer corner of the blank may rest on or in the chamfered edge 56 of the depression, so that said edge may serve as a ready means of centering the blank on the die 50: as shown, the outside diameter of the blank is exactly that of the bottom of the depression, so that the blank tends to seat and center itself at the very bottom of the depression. The center punch lacks the cylindrical upper portion of the punch 34 of Fig. V, and is not received in the upper die at all.

As regards the upper die 51, it will be observed that the member 57 embodying most of the acting die-face is annular, and fits around a downward projecting portion 58 of the top plate 59, about co-extensive with the top of the center punch 60. The annular forging band 62 extends (relatively) further inward and upward than does the band 42 in Fig. V, and not only shapes the entire outer or peripheral surface of the piece, but also affords a shoulder on which rests the outer edge of the member 57 which is suitably rabbeted at 63 for the purpose. The support thus afforded the member 57 not only allows bolting (as in Fig. V) to be dispensed with, but permits the two active upper die members (57 and 62) to be removed or replaced with the utmost facility, by mere removal or insertion of pins corresponding to the pins 43 in Fig. V.

In Fig. IX, we have illustrated the application of our invention to the production of a piece 65 of cross section more intricate and difficult than shown in Figs. V, VI and VIII. The most distinctive feature of this piece is the relatively great depth of its outer flange portion 70 and the nearly equal depth of the inner flange or shoulder portion 73. The contrast between the depth of these flanges and the minimum thickness of the web portion 76 at 77 is even more marked than in the other figures. The lower side of the piece 65 is flat, as in Figs. V and VI, and the depression in the lower die-face of Fig. VIII is absent. Aside from the distinctive shapes of the active die-faces and of the periphery of the center punch 78, this set of dies closely resembles that shown in Fig. VIII.

In order to secure the best results most conveniently and economically, it is important that the die-faces be properly designed along the lines exemplified in Figs. V, VIII, and IX. All corners past or around which the metal must flow should be eased or reduced by appropriate beading or filleting, and the die walls which extend in the direction of relative movement of the dies should also be eased or reduced, by inclination across the direction of relative movement of the dies, so as to make the channels or spaces that the metal last fills convergent and thus facilitate its flow into the extreme corners. This is more important in the outward portion of the die-pass, which the metal naturally fills a little less readily than the inward portion. As far as possible, the only sharp, unrounded corners in the die-pass should be those at its outer and inner extremities,—formed, as shown, by the forging band and the center punch. The active faces of these latter members, it will be observed, are eased by inclination (as mentioned above) in every instance.

The die members and parts may be made of cast or forged steel, much as dies used for pressing car wheels are made.

A matter of much importance in our method of forming a tire-mold piece by die-pressing is the proper correspondence of the blank with the piece to be produced. Not only should the amount of metal in the blank be just that required in the piece, but the proportions of the blank should be correlated with those of the piece, in a peculiar manner.

First (to illustrate by special reference to Figs. V and VI), the blank 7 should be of a depth or height comparable to that of the deep flange portion 20 of the piece 15; otherwise, it will be found impossible to make the metal fill out this flange portion to the full height shown. For the best results, the depth of the blank 7 should somewhat exceed that of the flange portion 20: thus the ratio of these depths is about 2:3 in Figs. V and VI, 4:5 in Fig. VIII, and 5:6 in Fig. IX. The radial width or dimension of metal in the blank, on the other hand, should be much less than that of the piece,—the ratio being about 2:5 in Figs. V and VI, 5:11 in Fig. VIII, and 6:9 in Fig. IX. This difference in radial widths as between the piece and the annular blank 7 should be obtained by making the inside and outside diameters of the blank materially greater and less, respectively, than those of the piece, as shown in the cases here illustrated. Accordingly, the best results are most readily secured when the cross section of the blank has such proportions as illustrated by Figs. V, VIII, and IX: i. e., when the depth of the blank is not substantially less than its radial width, but rather exceeds the radial width. For pieces of such forms as these, the mean circular size of the blank should correspond, approximately, to the zone or region of minimum thickness or depth of the web portion, as shown. For pieces of such forms as indicated in Figs. V, VI and VIII,—characterized by a relatively deep flange portion at or near one edge only,—one diameter of the blank will generally correspond pretty closely to (or range between) the diameter of the deep flange portion at or near its top (i. e., at or near 22 in Fig. VI) and that of the zone of merger between flange and web portions (about 21 in Fig. VI). In every case, the amounts of metal of the blank initially inside and outside the line of division (marked "D" in Figs. V, VIII and IX) between inward and outward radial flow in the die-pass during pressing should correspond as closely as possible to the amounts required to be inside and outside the same position in the formed piece. (In general, this line of flow division will correspond with the lowest point on the middle downward projection of the upper die member, where the portion of the mold-piece corresponding to the widest part of the tire is shaped. For a mold-piece with flat outer side, this will usually be the zone of minimum thickness of its web portion.)

With dies and a blank corresponding to these criteria, the die-pressing operation will cause a "squeezing down" displacement of the metal of the blank downward toward the base of the flange portion of the piece and radially inward and outward to form the inner and outer portions (including, in Figs. V and VI, the portions 24 and 25 as well as 20), and radially, especially, to form the deep flange portion or portions. It is to such formation of the deep flange portions principally by direct radial displacement (rather than by attempting to force the metal to a great height by mere pressure) that the peculiar advantages of our method are largely due; and this mode of formation is, in turn, rendered possible largely by the relatively great depth and narrow width of the blank,—already discussed above.

By our method described and explained above, we are able to make a forged steel side piece suitable for a mold to produce almost any ordinary commercial style of rubber tire by means of a single set of properly designed dies, virtually at a single operation. Often times, indeed, the finished piece can be accurately formed in a single pressing; sometimes, however, it may be found necessary or advisable to reheat the piece after pressing it once in the dies and repress it, in order to fill out the extreme corners and high parts properly. Such repressing is most apt to be required in producing pieces of especially intricate or otherwise difficult shapes; or when the dies are cold after a period of disuse; or when the blank is not placed just right in the dies, or is not of exactly the most suitable proportions; or when the blank is not heated quite to the proper temperature.

The forming of the tire-mold piece by hot die-pressing has certain special advantages over other methods of producing articles in forged steel. The mechanical work being done on the metal "en masse", so to speak, rather than in detail, there is less likelihood of local overheating, or of injury by working too cold, or of local overworking. On the other hand, the metal is subjected to a uniformity of pressure and working in the dies that tend to improve its grain and toughness, to compact it, and to correct any lack of homogeneity due to previous treatment that it may have undergone. The thorough and uniform effect of the die-pressing is enhanced, moreover, by the proportions of the annular blank discussed above, since they insure a very general moving about and deformation of nearly every portion of the blank during the pressing operation. The freedom of the hot die-pressed mold piece from internal stresses or strains is all the more important because of the oft-repeated quenchings at vulcanizing temperatures to which it is subjected in subsequent use. The die-pressing operation is, of course, facilitated by the fact that in the forging of the blank to ring shape as described above, the metal is permitted to expand freely under the force exerted on it by the hammers or rolls employed, so that the metal does not undergo any material compressive hardening until the die-pressing operation itself. The minimization of machining that results when the piece is wrought to within about one half inch or less of the final mold contour, as described above, is of advantage in leaving a portion of the most highly compacted outer skin of the piece to form the final surface of the finished mold.

Having thus described our invention, we claim:

1. The method of forming a tire mold side piece of laterally hollowed annular mold contour by hot die-pressing to the mold contour at substantially a single operation, by pressure in the axial direction, a metal blank of substantially less radial dimension of metal than the piece to be formed, and not substantially of less height, so as to bring the metal to the desired shape by squeezing down and radial displacement.

2. The method as set forth in claim 1 further characterized in that the blank is externally of smaller diameter than the highest portion of the piece, so that the metal of the blank is displaced radially to form the highest portion of the piece.

3. A method of producing a tire mold side piece of laterally hollowed annular mold contour which comprises forging a body of metal into a blank of substantially less radial dimension of metal than the piece to be formed and not substantially of less height, permitting the metal to expand freely during the forging, so as to avoid compressive hardening; and hot die-pressing the forged blank in the axial direction to the desired shape.

4. The method of forming a tire mold side piece of laterally hollowed annular mold contour by hot die-pressing in the axial direction a ring of much less radial width than the piece to be produced, and of greater height, between die faces of shapes appropriate for the sides of the piece, and thus bringing the ring to the desired mold shape at substantially a single operation.

5. The method as set forth in claim 4 further characterized in that the ring corresponds in circular size to the zone of minimum thickness of the piece to be produced therefrom.

6. A forged steel tire mold side piece of usual contour and shape, with laterally hollowed annular mold face, characterized by special toughness and homogeneity of grain of metal throughout the radial width of the piece, notwithstanding its complicated form, as a result of general radial displacement and compaction of the metal of the entire mass by working and compression thereof en masse rather than in detail by the formation of the piece out of a forged steel ring blank, of substantially less radial dimension and greater axial dimension than the piece, and substantially equal in mass to the piece, hot die-pressed altogether in the axial direction and thereby squeezed out radially in both directions from the deepest contour of the piece, to the desired form.

In testimony whereof, we have hereunto signed our names at Philadelphia, Pennsylvania, this 22nd day of November, 1920.

AMOS G. COLE.
HARRY B. COCHRAN.